US011318963B2

United States Patent
Kanoh (10) Patent No.: US 11,318,963 B2
(45) Date of Patent: May 3, 2022

(54) VEHICLE CONTROL APPARATUS, VEHICLE, AND VEHICLE CONTROL METHOD

(71) Applicant: HONDA MOTOR CO., LTD., Tokyo (JP)

(72) Inventor: Tadahiko Kanoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 16/934,157

(22) Filed: Jul. 21, 2020

(65) Prior Publication Data
US 2020/0346667 A1 Nov. 5, 2020

Related U.S. Application Data

(63) Continuation of application No. PCT/JP2018/003416, filed on Feb. 1, 2018.

(51) Int. Cl.
*B60W 60/00* (2020.01)
*B60W 10/20* (2006.01)
(Continued)

(52) U.S. Cl.
CPC ........ *B60W 60/0053* (2020.02); *B60W 10/20* (2013.01); *B60W 30/165* (2013.01);
(Continued)

(58) Field of Classification Search
CPC ......... B60W 60/0053; B60W 60/0025; B60W 10/20; B60W 30/165; B60W 40/06;
(Continued)

(56) References Cited

U.S. PATENT DOCUMENTS 9,187,095 B2 * 11/2015 Gerdt ................... B60W 30/16
9,811,092 B2    11/2017 Obuchi et al.
(Continued)

FOREIGN PATENT DOCUMENTS

JP    H07200991 A    8/1995
JP    H10205367 A    8/1998
(Continued)

OTHER PUBLICATIONS

English Translation: Feron, WO 2017037377 A1, Mar. 9, 2017, WIPO Patent Office Publication (Year: 2017).*
(Continued)

*Primary Examiner* — Nadeem Odeh
(74) *Attorney, Agent, or Firm* — Thomas | Horstemeyer, LLP (57) ABSTRACT

A vehicle control apparatus is provided. The vehicle control apparatus can obtain periphery information of a vehicle and perform following control including steering and acceleration/deceleration of the vehicle. In a case in which a front vehicle which is to be a following target does not satisfy a specific condition not including a speed condition, the vehicle control apparatus performs at least one of: lowering an automation level; and requesting a driver of the vehicle to perform a predetermined task which is not requested to the driver in a case in which the front vehicle satisfies the specific condition.

9 Claims, 4 Drawing Sheets

(51) Int. Cl.
*B60W 30/165* (2020.01)
*B60W 40/06* (2012.01)
*B60W 10/06* (2006.01)
*B60W 10/18* (2012.01)

(52) U.S. Cl.
CPC ........ *B60W 40/06* (2013.01); *B60W 60/0025* (2020.02); *B60W 10/06* (2013.01); *B60W 10/18* (2013.01); *B60W 2420/42* (2013.01)

(58) Field of Classification Search
CPC .. B60W 10/06; B60W 10/18; B60W 2420/42; B60W 2554/402; B60W 2556/20; B60W 60/0055; B60W 50/14
USPC .......................................................... 701/23
See application file for complete search history.

(56) References Cited

U.S. PATENT DOCUMENTS

| | | | |
|---|---|---|---|
| 10,065,644 | B2 | 9/2018 | Endo et al. |
| 11,049,392 | B2 | 6/2021 | Vamamoto et al. |
| 11,099,559 | B2 | 8/2021 | Fujimura et al. |
| 2015/0283998 | A1* | 10/2015 | Lind ..................... B60W 30/17 701/23 |
| 2016/0292998 | A1 | 10/2016 | Obuchi et al. |
| 2017/0313314 | A1 | 11/2017 | Sen et al. |
| 2018/0126991 | A1 | 5/2018 | Endo et al. |
| 2018/0198955 | A1 | 7/2018 | Watanabe |
| 2018/0229743 | A1 | 8/2018 | Aoi |
| 2019/0072957 | A1 | 3/2019 | Fujimura et al. |
| 2020/0320870 | A1 | 10/2020 | Yamamoto et al. |

FOREIGN PATENT DOCUMENTS

| | | | | |
|---|---|---|---|---|
| JP | 2000-105900 | A | 4/2000 | |
| JP | 2001-034897 | A | 2/2001 | |
| JP | 2008207729 | A | 9/2008 | |
| JP | 2014-133444 | A | 7/2014 | |
| JP | 2016192150 | A | 11/2016 | |
| JP | 2017021546 | A | 1/2017 | |
| JP | 2017097519 | A | 6/2017 | |
| JP | 6179654 | B1 | 8/2017 | |
| JP | 2017-197011 | A | 11/2017 | |
| JP | 2017-207955 | A | 11/2017 | |
| JP | 2018075968 | A | 5/2018 | |
| WO | 2016/052507 | A1 | 4/2016 | |
| WO | 2016152874 | A1 | 9/2016 | |
| WO | WO-2017037377 | A1 * | 3/2017 | ............ B60W 50/14 |
| WO | 2017/209112 | A1 | 12/2017 | |
| WO | 2019150525 | A1 | 8/2019 | |

OTHER PUBLICATIONS

Japanese Notice of Grant (with partial translation) for Japanese Patent Application No. 2019-568499 dated Aug. 10, 2021.
Japanese Office Action (with partial translation) for Japanese Patent Application No. 2019-568499 dated Jun. 11, 2021.
International Search Report for PCT/JP2018/003416 dated Mar. 13, 2018.

* cited by examiner

VEHICLE CONTROL APPARATUS, VEHICLE, AND VEHICLE CONTROL METHOD

CROSS-REFERENCE TO RELATED APPLICATION(S)

This application is a continuation of International Patent Application No. PCT/JP2018/003416 filed on Feb. 1, 2018, the entire disclosures of which is incorporated herein by reference.

TECHNICAL FIELD

The present invention relates to a vehicle control apparatus, a vehicle, and a vehicle control method, and more specifically to a vehicle following control technique with respect to a front vehicle.

BACKGROUND ART

In automated driving, a plurality of control modes including congestion following control have been proposed. Congestion following control is a control mode in which a vehicle control apparatus performs control so as to automatically follow a front vehicle while maintaining a safe vehicle distance with the front vehicle in a range equal to or less than a predetermined vehicle speed. For example, PTL 1 discloses a technique for automatically starting congestion following control in accordance with the speed of a front vehicle.

CITATION LIST

Patent Literature

PTL 1: Japanese Patent Laid-Open No. 10-205367

SUMMARY OF INVENTION

Technical Problem

Although front vehicle following is performed in congestion following control, a state in which a self-vehicle may not be able to travel by following a front vehicle may occur, for example, in a case in which the front vehicle is a small vehicle and the self-vehicle is a large vehicle or the like. Hence, in such a case, it may be difficult to stably continue the following control.

In consideration of the above problem, the present invention provides a technique for stably continuing following control.

Solution to Problem

According to the present invention there is provided a vehicle control apparatus that is a vehicle control apparatus that can obtain periphery information of a vehicle and perform following control including steering and acceleration/deceleration of the vehicle, wherein in a case in which a front vehicle which is to be a following target does not satisfy a specific condition not including a speed condition, the vehicle control apparatus performs at least one of lowering an automation level, and requesting a driver of the vehicle to perform a predetermined task which is not requested to the driver in a case in which the front vehicle satisfies the specific condition.

Advantageous Effects of Invention

According to the present invention, following control can be continued stably.

Other features and advantages of the present invention will become apparent from the description provided hereinafter with reference to the accompanying drawings. Note that the same reference numerals denote the same or similar components in the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

Arrangement Example

Figure 1:
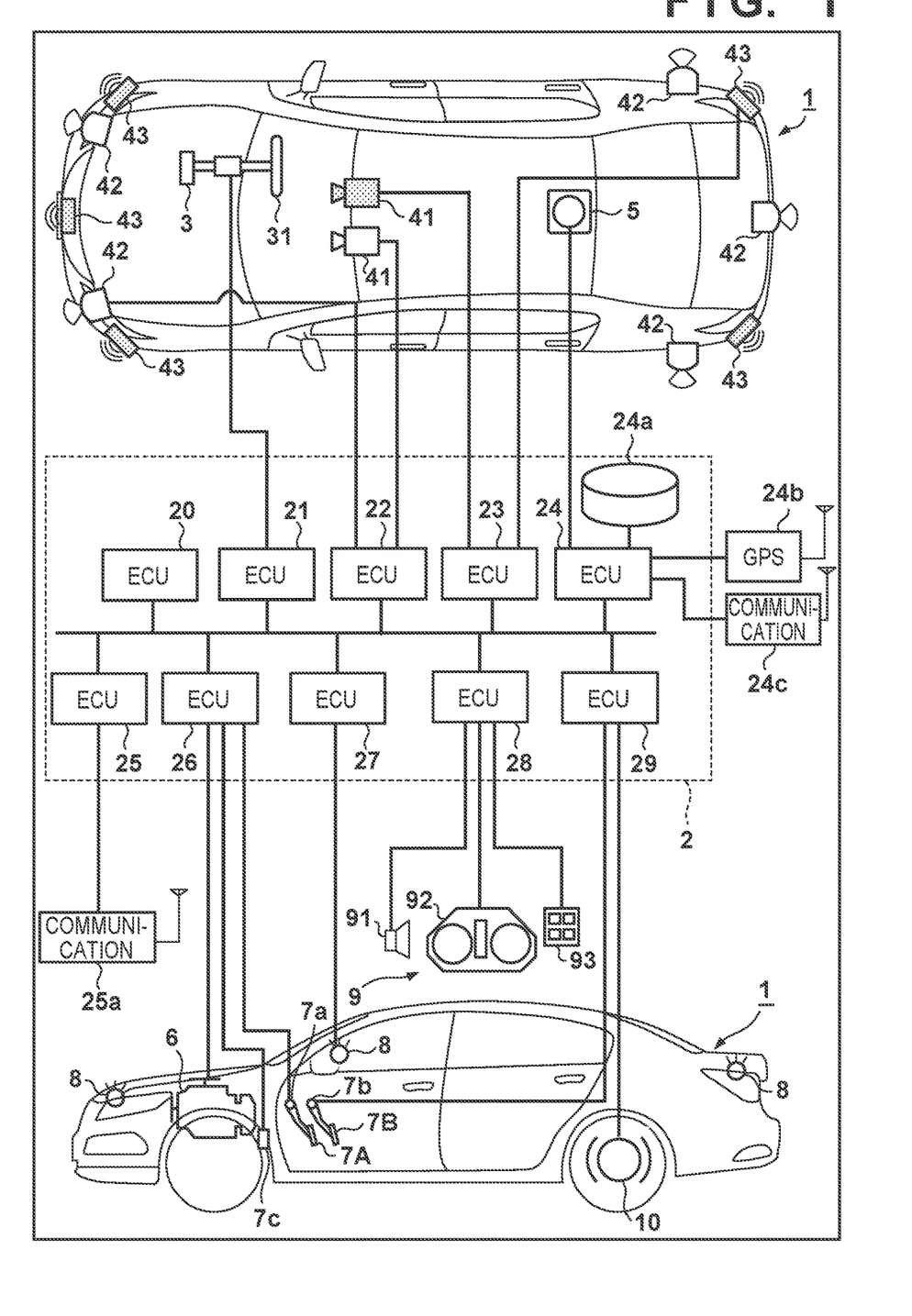
FIG. 1 is a block diagram of a vehicle control apparatus according to an arrangement example.

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle.

The vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed, and they can be subdivided or integrated as compared to this arrangement example.

The ECU 20 executes control associated with automated driving of the vehicle 1. In automated driving, at least one of steering and acceleration/deceleration of the vehicle 1 is automatically controlled. In the control example to be described later, the vehicle control apparatus can execute following control by automatically controlling the steering and the acceleration/deceleration of the vehicle 1 on the same lane.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving or driving support, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results (periphery information). Each detection unit 41 is a camera (to be sometimes referred to as the camera 41 hereinafter) that captures the front side of the vehicle 1. In this embodiment, two cameras are arranged at the front portion of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8. In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving or driving support, the ECU 29 automatically controls the brake device 10 in correspondence with an instruction from the ECU 20 and controls deceleration and stopping of the vehicle 1. The brake device 10 or the parking brake can also be operated to maintain the stopped state of the vehicle 1. In addition, if the transmission of the power plant 6 includes a parking lock mechanism, it can be operated to maintain the stopped state of the vehicle 1.

(Procedure of Processing)

Control which is related to automated driving of the vehicle 1 and executed by the ECU 20 (vehicle control apparatus) will be described. When a destination and an automated driving operation have been instructed by the driver, the ECU 20 automatically controls the vehicle 1 to travel toward the destination in accordance with a guidance route searched by the ECU 24. During automated driving, the ECU 20 controls the steering and the acceleration/deceleration of the vehicle 1 by obtaining information (periphery information) related to the peripheral state of the vehicle 1 from the ECUs 22 and 23 and instructing the ECUs 21, 26, and 29 based on the obtained periphery information. The ECU 20 may have a plurality of control modes to control the steering and the acceleration/deceleration of the vehicle 1.

The ECU 20 can perform automated driving control by switching, for example, a plurality of control modes which include front vehicle following control. A case in which the ECU 20 performs automated driving control by using three modes (modes 1 to 3) will be exemplified hereinafter. In mode 1, the ECU 20 controls the vehicle 1 so as to support the driver's driving operations including merging and diverging. The driver is requested by the ECU 20 to monitor the periphery and to grip the steering wheel in mode 1. In mode 2, the ECU 20 performs automated driving control including lane maintenance and lane change control. The driver is requested by the ECU 20 to monitor the periphery, but not requested to grip the steering wheel in the ECU 20 in mode 2. Note that a front vehicle need not be present in the control modes of mode 1 and mode 2. In mode 3, in a state in which a front vehicle is present and the self-vehicle is traveling at a low speed compared to mode 2, the ECU 20 controls the steering and the acceleration/deceleration of the vehicle 1 on the same lane so that the vehicle 1 will follow the front vehicle which is to be the following target. In mode 3, the driver is neither requested to monitor the periphery nor grip the steering wheel, and the ECU 20 permits the driver to perform, for example, a second task unrelated to driving. However, even in mode 3, the ECU 20 may request the driver to perform tasks such as fastening a seatbelt and sitting in the driver's seat to prevent a state in which the driver cannot immediately deal with a shift to mode 2, such as a state in which the driver moving to another seat, a state in which the driver falls asleep, and the like. In this case, the change in the control mode corresponds to the change in the automation level. That is, a shift to a control mode that requests fewer tasks corresponds to a state in which the automation level is relatively increased, and a shift to a control mode that requests more tasks corresponds to a state in which the automation level is relatively decreased. Note that the "automation levels" used in this specification need not correspond to the automation levels set by, for example, the National Highway Traffic Safety Administration of the United States Department of Transportation.

In such following control, the driver's driving load can be greatly reduced by performing control to make the vehicle 1 travel on a track traveled by a front vehicle if a front vehicle is stably present or travel along a lane based on the division lines of the lane on which the self-vehicle is traveling. On the other hand, for example, a state in which the front vehicle has a minimum ground clearance which is greatly higher than the minimum ground clearance of the vehicle 1 may give the driver of the vehicle 1 a sense of incongruity if the vehicle is made to simply follow the front vehicle. For example, in a case in which an object of a size which is not much of an obstacle for the front vehicle is present on the road, the front vehicle may not avoid this obstacle because it can easily pass over the this obstacle, but the vehicle 1 may need to avoid this obstacle. At this time, it can be expected that this object, which will seem to have suddenly appeared, will be detected by the vehicle 1 that has been traveling by following control, and the control will be transferred to the driver as a result. In this case, since control transfer will be suddenly requested to the driver, the driver can feel a sense of incongruity as a result. Hence, this embodiment will be arranged so that the driver will be able to prepare for the control transfer by requesting the driver to execute predetermined tasks such as the periphery monitoring tasks and the like in a case in which a predetermined condition cannot be satisfied. This will allow automated driving by following control to be continued stably while reducing the above-described sense of incongruity for the driver. Several control examples of such processing will be described hereinafter.

First Control Example

Figure 2:
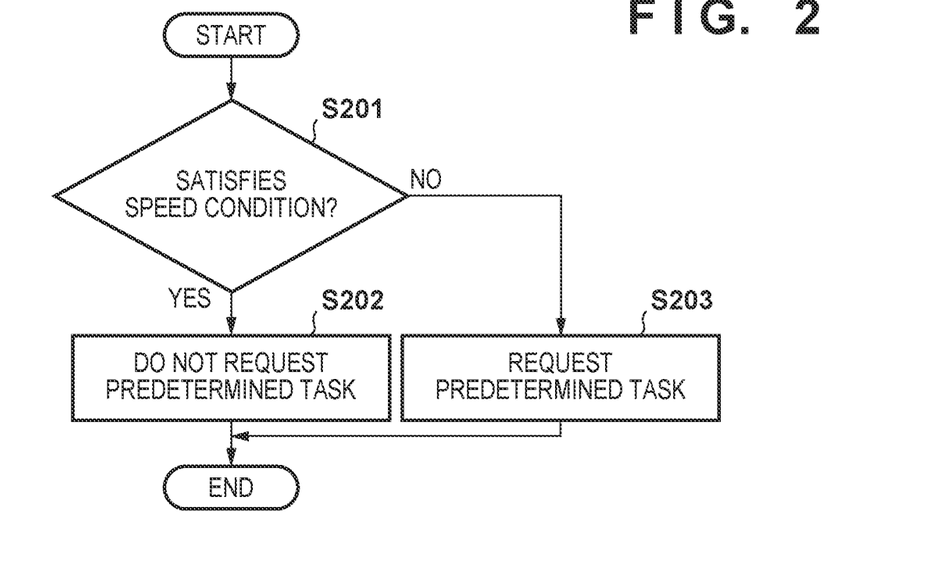
FIG. 2 is a flowchart showing task determination processing according to a first control example.

The processing based on the speed condition of the front vehicle will be described with reference to FIG. 2. This processing can be executed by the ECU 20 at a predetermined time interval.

In step S201, the ECU 20 determines whether the speed of the front vehicle satisfies a predetermined condition by using, for example, the speed of the vehicle 1 obtained from the vehicle speed sensor 7c via the ECU 26 and the relative speed of the front vehicle obtained from the detection units 41 to 43 via the ECU 22 or the ECU 23.

In one example, the condition can be a state in which the speed of the front vehicle is equal to or less than the speed of the vehicle 1 or a speed set by the ECU 20. For example, in a case in which the ECU 20 of the vehicle 1, which is traveling by mode 2 (for example, the setting speed is 100 km/h), detects that the front vehicle is traveling at a speed equal to or less than the speed of the vehicle 1, the vehicle 1 can continue to travel by mode 2 while maintaining the following distance. Also, in a case in which the ECU 20 of the vehicle 1, which is traveling by mode 2 by maintaining the following distance with respect to the front vehicle, has determined that the travel speed of the front vehicle has become equal to or less than a second setting speed (for example, 40 km/h), the ECU 20 can execute following control by raising the automation level from mode 2 to mode 3. Note that each speed set by the ECU 20 may be a value set based on the speed limit of the road on which the self-vehicle is traveling.

Also, this setting speed can be changed, for example, in accordance with whether the driver has been requested to execute predetermined tasks by a processing operation (to be described later). For example, the setting speed can be reduced more while the execution of predetermined tasks has been requested than while the execution of the predetermined tasks has not been requested. As a result, the predetermined task execution request will be canceled only when the travel speed of the front vehicle has decreased sufficiently, and it will be possible to prevent a state in which the predetermined task execution request and the cancellation thereof are frequently repeated. A similar argument can also be applied to the control mode. In one example, the control mode may be changed to mode 3 in a case in which the speed of the front vehicle becomes equal to or less than 40 km/h in a state in which the control mode is, for example, mode 2, and the control mode may be subsequently changed to mode 2 in a case in which the speed of the front vehicle has exceeded, for example, 60 km/h.

If it is determined that the speed of the front vehicle does not satisfy the condition (NO in step S201), the process advances to step S203, and the ECU 20 performs at least one of lowering the automation level and requesting the driver to perform the predetermined tasks. If it is determined that the speed of the front vehicle is equal to or less than the predetermined speed and satisfies the speed condition (YES in step S201), the process advances to step S202, and the ECU 20 performs at least one of raising the automation level and not requesting the predetermined tasks which are requested in step S203.

Note that in steps S202 and S203, whether tasks will be requested and whether control mode change will be performed can be changed in accordance with the control mode of the ECU 20. For example, control can be performed so that the automation level is not lowered in a case in which the control mode of the ECU 20 is mode 2 in step S203, and the automation level is lowered in a case in which the control mode of the ECU 20 is mode 3. Also, for example, control can be performed so that the control mode is raised to mode 3 in a case in which the control mode of the ECU 20 is mode 2 in step S202, and the control mode is not changed in a case in which the control mode of the ECU 20 is mode 3 in step S202. Note that in step S202, the ECU 20 may request the driver to perform a task as long as it is a task other than the predetermined tasks to be requested in step S203. That is, in step S203, the ECU 20 may request the driver to perform both the predetermined tasks and a task in common with that of step S202. Alternatively, the ECU 20 may request the driver to perform the predetermined tasks in step S203, and the ECU 20 may request the driver to perform, in step S202, a task different from the predetermined tasks.

As described above, in this control example, in case in which the speed of the front vehicle does not satisfy a condition, the vehicle control apparatus performs at least one of setting the automation level lower than the automation level in a case in which the condition is satisfied and requesting the driver to perform a task which is not requested to the driver in a case in which the condition is satisfied.

As a result, it becomes possible to allow the driver to prepare for a driving control transfer by requesting the driver to execute the predetermined tasks in advance before, for example, the travel speed of the front vehicle stops satisfying the condition to be the following target. Hence, since the driving control transfer will not be suddenly requested to the driver, it becomes possible to reduce the sense of incongruity that is given to the driver. Furthermore, the driving load of the driver can be reduced because the automated driving control will be continued as much as possible while the execution of the predetermined tasks is requested to the driver.

Second Control Example

Figure 3:
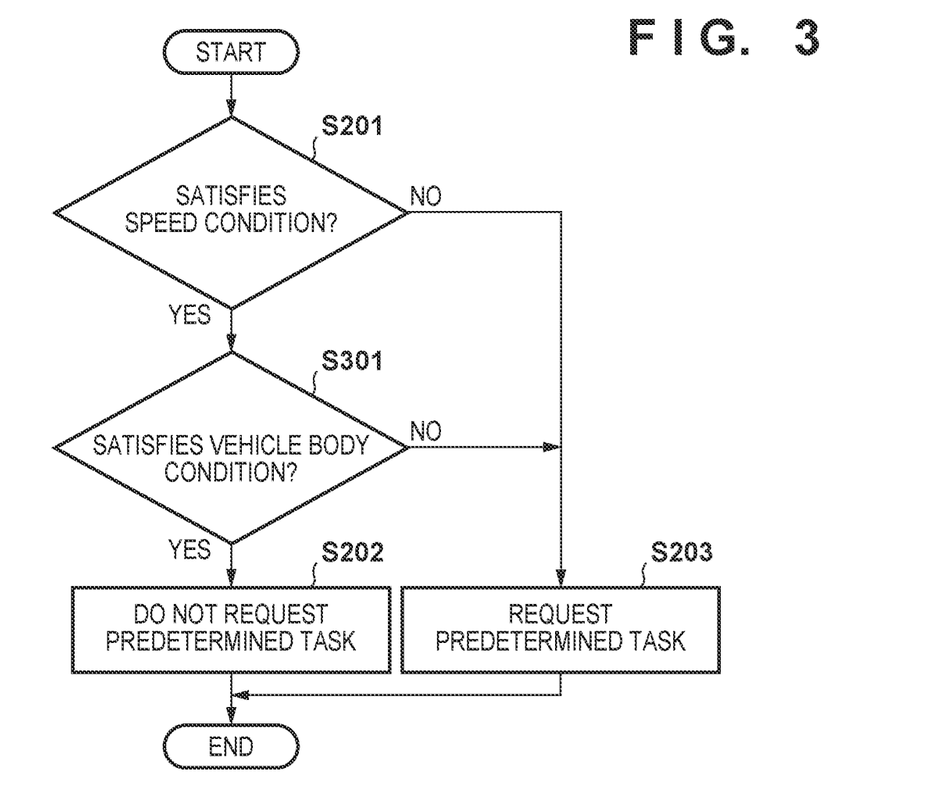
FIG. 3 is a flowchart showing the task determination processing according to a second control example.

The processing based on information related to the vehicle body of the vehicle 1 and information related to the vehicle body of the front vehicle will be described next with reference to FIG. 3. Note that a description of processes denoted with the same reference symbols as the processes of the first control example will be omitted.

In step S301, the ECU 20 determines whether the information related to the vehicle body of the front vehicle and the information related to the vehicle body of the vehicle 1 satisfy a predetermined condition.

The information related to the vehicle body of the front vehicle is, for example, information related to the vehicle type. In this case, for example, it can be determined that the predetermined condition is satisfied (YES in step S301) if the vehicle type of the front vehicle and the vehicle type of the vehicle 1 are the same, and it can be determined that the predetermined condition is not satisfied (NO in step S301) if the vehicle types are different. The vehicle type of the front vehicle can be determined by causing the ECU 20, the ECU 22, or the ECU 23 to analyze an image captured by the cameras 41 that capture the front side of the self-vehicle. The vehicle type of the front vehicle may also be determined by using, for example, the communication device 25a to communicate with the front vehicle (for example, by inter-vehicle communication) and receiving information related to the vehicle type from the front vehicle or the like.

In this case, the vehicle type may be defined in any manner as long as it allows a plurality of vehicles to be classified into two or more groups. For example, the vehicle type may be defined by a category based on the size of the vehicle such as a normal automobile, small automobile, light-weight automobile, a large-sized specialized automobile, or the like. Alternatively, the vehicle type may be defined by a category based on the use of the vehicle such as a police vehicle, an emergency vehicle, a construction vehicle, or the like. Alternatively, the vehicle type may be defined by a category based on a following target list that can be obtained by the ECU 20, such as a list for determining whether the front vehicle is a vehicle which has been pre-registered as a following target in the ECU 20 by the driver. Alternatively, the vehicle type may be defined by a category which is determined based on information related to a license plate indicating, for example, whether the front vehicle is a rental car or not.

Note that it is sufficient for the determination in step S301 to be performed by using the information related to the vehicle type of the front vehicle and the information of the vehicle type of the vehicle 1, and a determination as to whether the vehicle type of the front vehicle and the vehicle type of the vehicle 1 are the same need not always be performed. For example, it may be arranged so that it will be determined that the predetermined condition is satisfied (YES in step S301) in a case in which the vehicle 1 is a normal automobile and the vehicle type of the front vehicle is a normal automobile, small-sized automobile or a light automobile, and the process will advance to step S202 or the like. This will allow the driver to prepare for the transfer of the driving control by requesting the driver to execute the predetermined tasks in advance before the occurrence of a state in which the front vehicle, whose vehicle type is different from the vehicle type of the vehicle 1, stops satisfying the condition to be the following target, such as a state in which the front vehicle begins to travel on a passage lane dedicated to its vehicle type.

In addition, for example, the information related to the vehicle body of the front vehicle may be, for example, information related to the size of the front vehicle including at least one of the pieces of information of the vehicle width, the vehicle height (the height from the ground surface of the vehicle to the roof of the vehicle), and the minimum ground clearance (the minimum gap between the vehicle body and the ground surface of the vehicle). In this case, the ECU 20 can determine the size of the front vehicle by analyzing images captured by the cameras 41 which capture the front side of the self-vehicle. Alternatively, for example, the ECU 25 may receive and obtain the information related to the size of the front vehicle via communication device 25a (for example, by inter-vehicle communication). Alternatively, the information related to the vehicle type may be obtained from the front vehicle via the communication device 25a, the obtained information related to the vehicle type may be transmitted to the server via the communication device 24c, and the information related to the size of the front vehicle may be obtained from the server.

For example, in a case in which the determination in step S301 is to be performed based on the information related to the vehicle width of the front vehicle and the information related to the vehicle width of the vehicle 1, the ECU 20 will determine in step S301 that a predetermined relationship is satisfied if the vehicle width of the front vehicle is equal to or more than a predetermined width based on the vehicle width of the vehicle 1. Alternatively, the ECU 20 will determine in step S301 that a predetermined relationship is satisfied if the difference between the vehicle width of the front vehicle and the vehicle width of the vehicle 1 is equal to or less than a predetermined value. If the ECU 20 determines that the information related to the vehicle width of the front vehicle and the information related to the vehicle width of the vehicle 1 satisfy a predetermined relationship (YES in step S301), the ECU 20 will perform at least one of raising the automation level and not requesting the driver to perform the predetermined tasks (step S202). If it is determined that the information related to the vehicle width of the front vehicle and the information related to the vehicle width of the vehicle 1 does not satisfy a predetermined relationship (NO in step S301), the ECU 20 performs at least one of lowering the automation level and requesting the driver to perform the predetermined tasks (step S203). This will allow the driver to prepare for a driving control transfer by requesting the driver to execute the predetermined tasks in advance before the front vehicle, which has a vehicle width smaller than the vehicle width of the vehicle 1, is canceled as the following target in a state in which the front vehicle is traveling a road with a road width which cannot be traveled by the vehicle 1. Furthermore, since it is possible for the front vehicle to be canceled as the following target in a state in which the front vehicle is to pass through the lateral side of a parked or stopped vehicle, a state in which the front vehicle is to depart from the center of the lane (in the vehicle width direction) to avoid an obstacle, or the like, the driver may be requested to execute the predetermined tasks in advance.

In a similar manner to the vehicle width, the information related to the vehicle height or the minimum ground clearance may be obtained by analyzing the images captured by the cameras 41 or by receiving the information from the front vehicle via the communication device 25*a* (for example, by inter-vehicle communication). The determination of step S301 is performed in accordance with a predetermined condition such as whether the vehicle height of the front vehicle is higher than the vehicle height of the vehicle 1, whether the minimum ground clearance of the front vehicle is lower than the minimum ground clearance of the vehicle 1, or the like. Alternatively, the determination of step S301 is performed in accordance with a predetermined condition such as whether the difference between the vehicle height of the front vehicle and the vehicle height of the vehicle 1 is equal to or less than a predetermined value, whether the difference between the minimum ground clearance of the front vehicle and the minimum ground clearance of the vehicle 1 is equal to or less than a predetermined value, or the like. That is, the ECU 20 can perform (step S203) at least one of lowering the automation level and requesting the driver to perform the predetermined tasks in a case in which the predetermined condition is not satisfied (NO in step S301) such as a case in which the vehicle height of the front vehicle is lower than the vehicle height of the vehicle 1 or in a case in which the difference between the vehicle height of the front vehicle and the vehicle height of the vehicle 1 is larger than the predetermined value. Also, the ECU 20 can perform (step S203) at least one of lowering the automation level and requesting the driver to perform the predetermined tasks in a case in which the predetermined condition is not satisfied (NO in step S301) such as a case in which the minimum ground clearance of the front vehicle is higher than the minimum ground clearance of the minimum ground clearance of the vehicle 1 or in a case in which the difference between the minimum ground clearance of the front vehicle and the minimum ground clearance of the vehicle is larger than the predetermined value.

For example, in a case in which the vehicle height of the front vehicle is lower than the vehicle height of the vehicle 1, travel may be performed on a road on which the front vehicle can pass but the vehicle 1 cannot pass due to vehicle height restrictions. Also, in a case in which the minimum ground clearance of the front vehicle is higher than the minimum ground clearance of the vehicle 1, a state in which the front vehicle can pass but the vehicle 1 cannot pass can occur due to an obstacle on the road. In this case, the vehicle control apparatus, which has detected that the self-vehicle will not be able to pass, can stop the following control and transfer the control to the driver. At this time, since the transfer of control will be suddenly requested, the driver may feel a sense of incongruity as a result. Hence, in this control example, in a case in which the information related to the vehicle height or the minimum ground clearance of the front vehicle and the information of the vehicle height or the minimum ground clearance of the vehicle 1 do not satisfy the predetermined condition and the driver has not been requested to execute the predetermined tasks such as periphery monitoring and the like, the driver will be requested to execute the predetermined tasks. As a result, the driver will be able to prepare for the transfer of the control. Note that in a case in which the execution of predetermined tasks, such as the periphery monitoring and the like, has already been requested, the execution of the predetermined tasks need not be requested again.

In addition, for example, the condition related to the vehicle body of the front vehicle may be information related to the weight of the front vehicle. In this case, the ECU 25 can obtain the information related to the weight of the front vehicle by receiving the information related to the weight of the front vehicle from the front vehicle via the communication device 25*a* (for example, by inter-vehicle communication). Also, the weight of the front vehicle may be determined by causing the ECU 25 to obtain the information related to the vehicle type via the communication device 25*a*, transmit the obtained information related to the vehicle type to a predetermined server via the communication device 24*c*, and obtain the information related to the weight corresponding to the information related to the vehicle type. In this case, for example, the ECU 20 can determine that the predetermined condition is satisfied (YES in step S301) if the weight of the front vehicle is equal to or more than the weight of the vehicle 1, and perform at least one of not lowering the automation level and not requesting the driver to perform the predetermined tasks (step S202).

According to this arrangement, it is possible to allow the driver to prepare for a driving control transfer by requesting the driver to execute the predetermined tasks in advance before a front vehicle whose weight is lighter than the vehicle 1 is canceled as a following target by traveling a road which cannot be traveled by the vehicle 1 due to a weight restriction or the like.

Note that the ECU 20 may perform the determination of step S301 by determining whether the plurality of pieces of information related to the vehicle body of the front vehicle satisfy a plurality of conditions. For example, the ECU 20 can determine that predetermined conditions are satisfied in a case in which the difference between the vehicle width of the front vehicle and the vehicle width of the front vehicle is equal to or less than a predetermined value and the difference between the vehicle height of the front vehicle and the vehicle height of the vehicle 1 is equal to or less than a predetermined value, and the ECU can determine that the predetermined conditions are not satisfied in other cases. Also, the ECU 20 can determine that the predetermined conditions are satisfied, for example, in a case in which the vehicle width of the front vehicle is equal to or more than the vehicle width of the vehicle 1 and in case in which the vehicle width of the front vehicle is less than the vehicle width of the vehicle 1 but the vehicle height of the front vehicle is equal to or more than the vehicle height of the vehicle 1, and the ECU can determine that the predetermined conditions are not satisfied in other cases. That is, the condition determination can be performed by arbitrarily combining the plurality of conditions and generating a plurality of branches.

In addition, in a case in which a front vehicle, which is a towed vehicle, is being towed by a vehicle, which is a towing vehicle, in front of the front vehicle, the determination of step S301 may be performed based on the information of the vehicle body of at least one of the towed vehicle and the towing vehicle. The vehicle 1 can detect that the towing vehicle is towing the towed vehicle by analyzing the images captured by the cameras 41 and detecting the rear reflectors of the front vehicle as the towed vehicle or obtaining information by communicating with either the towing vehicle or the towed vehicle. In such a case, the ECU 20 may perform the determination of step S301 based on the information related to the vehicle body of the towed vehicle or the towing vehicle. For example, even in a case in which it has been determined that a front vehicle does not satisfy the condition of step S301, the ECU 20 may determine that the condition of the step S301 is satisfied if the front vehicle is a towed vehicle, the information of the towing vehicle is obtained, and the obtained information is determined to satisfy the condition of step S301. A similar argument is also applicable to a case in which the front vehicle is not a towing vehicle. That is, even in a case in which the information related to the vehicle body of the front vehicle does not satisfy the condition of step S301, if another vehicle from which the information related to the vehicle body can be obtained by using a sensor or by communication is present in the front of the vehicle 1 within a predetermined following distance, it may be determined that this other vehicle satisfies the condition of step S301.

As described above, according to the second control example, the vehicle control apparatus performs at least one of lowering the automation level and requesting the driver to perform the predetermined tasks based on whether there is a predetermined relationship between the information related to the vehicle body of the front vehicle and the information related to the vehicle body of the vehicle 1. Hence, it will be possible to request the driver to perform, in advance, the predetermined tasks such as periphery monitoring and the like in preparation for a state in which the vehicle 1 is to travel on a road passable which can be passed a front vehicle, but cannot be passed by the self-vehicle. This will allow control to be transferred smoothly to the driver in a case in which such a state has occurred. As a result, it will be possible to reduce the sense of incongruity given to the driver because driving control transfer will not be suddenly requested to the driver. In addition, since automated driving control will be continued as much as possible while the driver is being requested to execute the predetermined tasks, the driving load of the driver can be reduced.

Third Control Example

The processing based on information related to the behavior of the front vehicle will be described next with reference to FIG. 4. Note that a description of processes denoted with the same reference symbols as the processes of the first control example or the processes of the second control example will be omitted.

Figure 4:
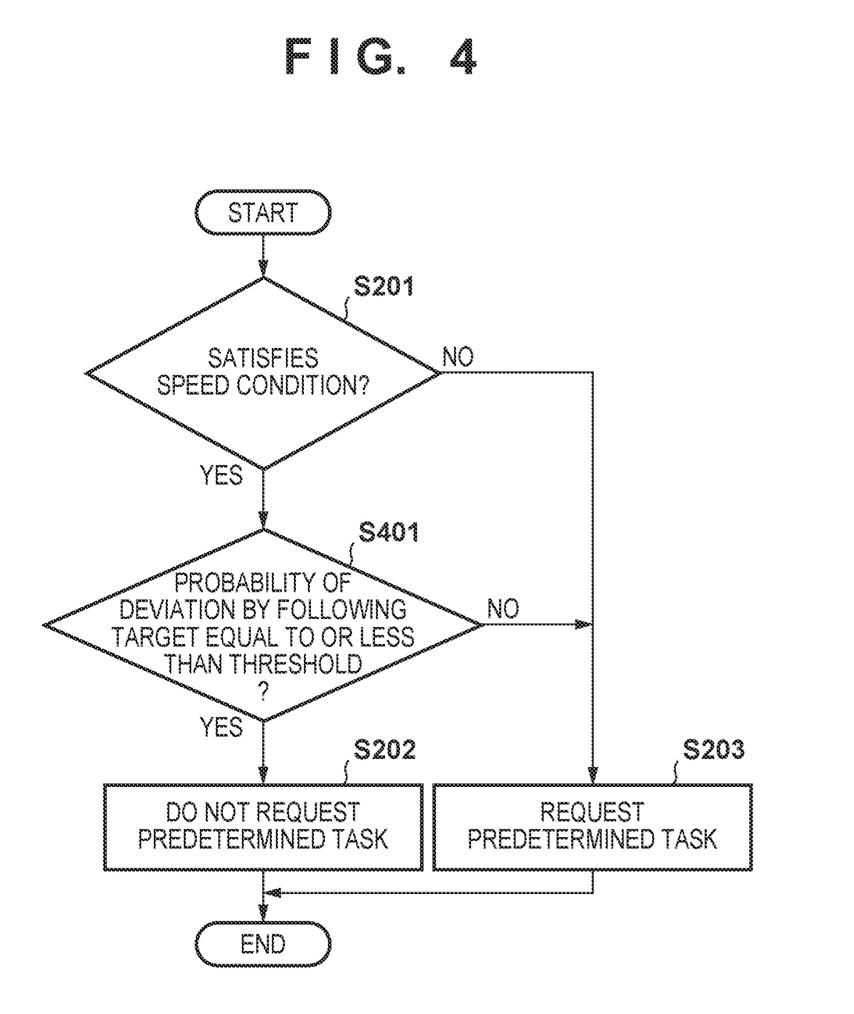
FIG. 4 is a flowchart showing the task determination processing according to a third control example.

FIG. 4 shows an example of a case in which the information related to the behavior of the front vehicle is, for example, the information of the probability that the front vehicle will stop satisfying the requirements to be a following target. That is, in step S401, the ECU 20 determines whether the probability that a front vehicle, which is traveling on the same lane as the self-vehicle, will stop satisfying the requirements to be the following target is equal to or less than a predetermined value. For example, the probability that the front vehicle will stop satisfying the requirements to be the following target increases in case in which the front vehicle departs from the center line of the lane or in a case in which the front vehicle intends to make a lane change. Also, the probability that the front vehicle will stop satisfying the requirements to be the following target increases in case in which the front vehicle is traveling toward a road junction. Note that the ECU 20 can prepare, in advance, a table in which a probability is associated with each behavior of the front vehicle and refer to the table in accordance with the behavior of the front vehicle detected based on the periphery information to obtain the corresponding probability. In addition, the ECU 20 may also calculate the probability that the front vehicle will stop satisfying the requirements to be the following target by, for example, providing an image indicating the periphery information as an input to a predetermined function. This predetermined function can be, for example, a function that has been obtained by machine learning using many data of behaviors actually taken by various kinds of vehicles in various kinds of situations.

In addition, the ECU 20 may also obtain the probability that the front vehicle will stop satisfying the requirements to be the following target by analyzing the information related to the travel operation of the front vehicle obtained by the ECU 25 via inter-vehicle communication. If the ECU 20 determines that the probability that the front vehicle will stop satisfying the requirements to be the following target is equal to or less than the predetermined value (YES in step S401), the process advances to step S202. On the other hand, if the ECU 20 determines that the probability that the front vehicle will stop satisfying the requirements to be the following target is more than the predetermined value, the process advances to step S203.

As described above, according to this control example, the automation level is lowered or the driver is requested to perform the predetermined tasks in a case in which the probability that the front vehicle will stop satisfying the requirements to be the following target is high. As a result, it will be possible to stably continue vehicle control by requesting the driver to perform tasks such as periphery monitoring and the like before the front vehicle stops satisfying the requirements to be the following target. Hence, even if the front vehicle subsequently makes any kind of behavior, following control will be able to be operated stably in the self-vehicle because following control will be performed in a range in which following control can be performed and control will be transferred to the driver as needed. Furthermore, since automated driving will be continued until the front vehicle actually stops satisfying the requirements to be the following target, the driving load of the driver can be suppressed.

Fourth Control Example

Figure 5:
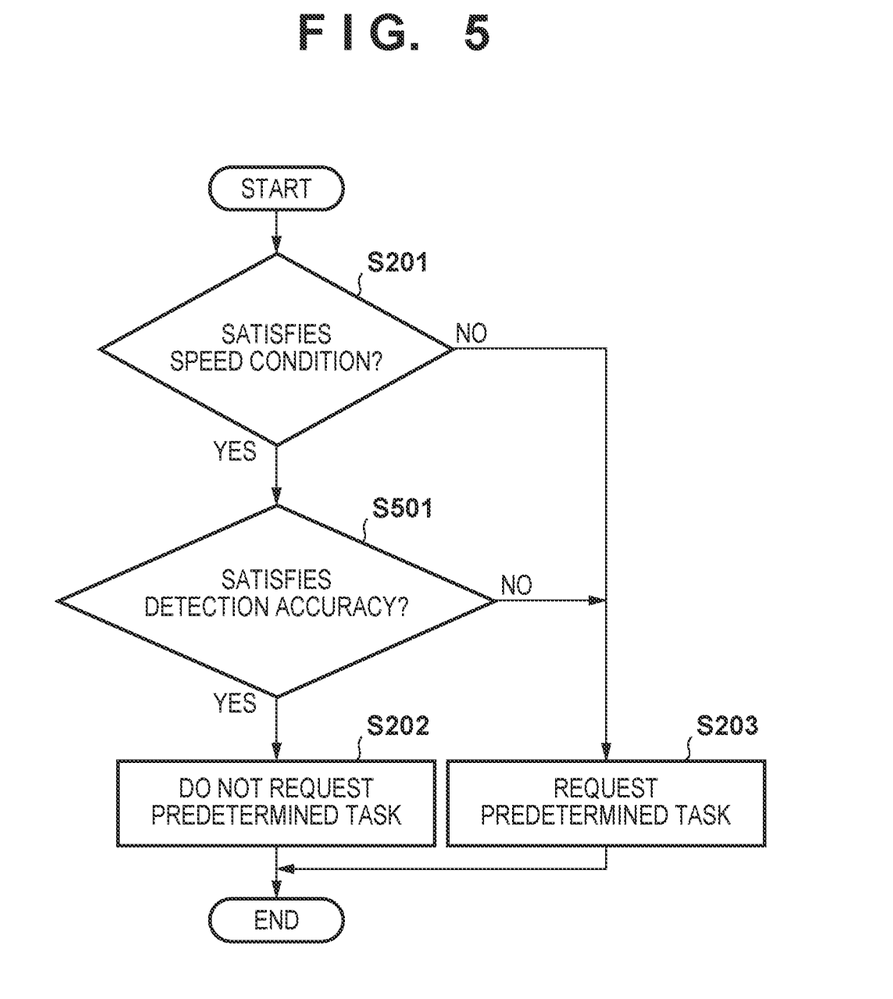
FIG. 5 is a flowchart showing the task determination processing according to a fourth control example.

The processing based on whether the detection accuracy of the front vehicle is equal to or more than a predetermined detection accuracy will be described next with reference to FIG. 5. Note that a description of processes denoted with the same reference symbols as the processes of the first control example, the processes of the second control example, or the processes of the third control example will be omitted.

In this control example, in step S501, the ECU 20 determines whether the accuracy of data obtained from the sensors for obtaining information related to the speed, the vehicle body, or the behavior of the front vehicle is satisfactory.

For example, the accuracy of the data is determined based on the performance of each sensor in the environment or the condition in which the data was measured. For example, greater noise can be included in image data because the detection accuracy of each camera 41 can degrade depending on the weather, the peripheral light environment, and the state of the optical path. Hence, the data accuracy (detection accuracy) of each camera 41 at the time of image obtainment can be estimated by causing the ECU 22 or the ECU 23 to analyze the luminance distribution, the resolution, or the like of an image obtained from each camera 41. Alternatively, the ECU 20 may obtain the information such as the weather, the peripheral light environment, the optical path, and the like related to the detection accuracy of each camera 41 from the camera 41 or another sensor to estimate the detection accuracy of the camera 41. Also, the measurement accuracy of each LiDAR 42 and each radar 43 can change depending on changes in the propagation environment due to weather such as rain, snow, or the like, dust on the sensor surface, and the like. Hence, the ECU 22 or the ECU 23 can estimate the measurement accuracy (detection accuracy) based on information related to the reflected wave included in the measurement data obtained via each LiDAR 42 or each radar 43. Alternatively, the ECU 20 may estimate the detection accuracy of each LiDAR 42 or each radar 43 based on information related to the propagation environment such as the weather and the like obtained via the communication device 24c or the like.

In this manner, the ECU 20 can obtain the information related to the detection accuracy of the data obtained by each sensor, based on the data obtained from the sensor or another sensor. Alternatively, the ECU 20 may hold, in advance, the information related to the performance of each sensor corresponding to the measurement condition and read out the information in accordance with the measurement condition received from each sensor or each sensor may transmit the information related to the data detection accuracy to the ECU 20.

In step S501, for example, upon determining that the detection accuracy is not satisfactory (is lower than a predetermined detection accuracy), the ECU 20 advances the process to step S203. Otherwise, the ECU 20 advances the process to step S202.

In step S501, for example, the ECU 20 can determine that the detection accuracy is equal to or higher than a predetermined detection accuracy in a case in which all of the obtained data accuracies are equal to or higher than the predetermined accuracy. Alternatively, the detection accuracy may be determined to be equal to or higher than the predetermined detection accuracy in a case in which the data accuracy obtained from a predetermined number or more of sensors is equal to or higher than a predetermined accuracy.

In a case in which the data from a plurality of sensors are to be used to obtain one piece of information (for example, the vehicle width or the like) related to the front vehicle, the ECU 20 may determine that the detection accuracy satisfies a predetermined detection accuracy even if not all of the obtained data accuracies do not satisfy the predetermined detection accuracy. For example, the detection accuracy may be determined to be equal to or higher than the predetermined detection accuracy in a case in which the ECU 20 has determined that one of statistical parameters such as the mean, the highest value, the median, and the like of the plurality of data accuracies related to one piece of information is equal to or more than a predetermined threshold. Alternatively, the detection accuracy may be determined to be equal to or higher than the predetermined detection accuracy in a case in which it can be determined that the information related to the front vehicle necessary for the determination has been obtained by using only the data whose detection accuracy is equal to or higher than the predetermined detection accuracy among the obtained data.

As described above, according to this control example, the automated driving level is lowered or the driver is requested to perform the predetermined tasks if the detection accuracy of the front vehicle is lower than a predetermined detection accuracy. As a result, in a case in which the detection accuracy of data related to the front vehicle is low, the vehicle control apparatus can lower the automation level or request the driver to perform tasks so that control can be continued stably.

Note that in a case in which the detection accuracy of the information related to the vehicle type or the vehicle body of the front vehicle does not satisfy a predetermined detection accuracy, the ECU 20 may request the driver to input the information related to the vehicle type or the vehicle body or input the information related to the following control determination of the ECU 20. In such a case, the ECU 20 may perform the process of step S501 based on the input information as long as the information has been input by the driver. For example, the ECU 20 may, in a case in which the vehicle type of the front vehicle could not be determined, display vehicle type candidates on the input/output device 9 or the like and request a user to specify and input the vehicle type on the input/output device 9. Alternatively, in case in which the ECU 20 determines that the detection accuracy of the front vehicle does not satisfy the predetermined detection accuracy, the ECU 20 can notify, via the input/output device 9 or the like, the driver of a message prompting the driver to determine whether the following control is to be performed, and the ECU may follow the instruction input by the driver. This will allow control to be continued stably even in a case in which the front vehicle could not be detected by the vehicle control apparatus.

Other Control Examples

The above-described first to fourth control examples can be combined arbitrarily. For example, the vehicle control apparatus may determine the task to be request to the driver based on the accuracy of the data related to the front vehicle obtained by the sensors of the vehicle 1 and the conditions including the vehicle type, the vehicle body, and the behavior of the front vehicle. For example, it may be set so that periphery monitoring will be requested in a case in which the vehicle type of the front vehicle is different from the vehicle type of the vehicle 1, gripping of the steering wheel will be requested in a case in which the front vehicle does not satisfy the requirements to be the following target, or the like.

The vehicle control apparatus may also change a specific condition based on the map information, the road surface information, and the like obtained by the communication device 24c. For example, if the vehicle 1 including the vehicle control apparatus according to the second control example can determine, based on the obtained map information, that the self-vehicle is traveling on a road without a vehicle type restriction, the vehicle control apparatus may not use, for a predetermined period, the information related to the vehicle type of the front vehicle when determining the tasks of the driver. Alternatively, in a case in which the vehicle control apparatus is to perform a determination based on the information related to the vehicle type including a category based on the size of the vehicle and a category based on the use of the vehicle, the vehicle control apparatus may perform the determination based on only the information related to the use of the vehicle when the self-vehicle is to travel a road without a vehicle type restriction. That is, the vehicle control apparatus may, based on the map information or the like, select and combine the conditions to be used for the determination from a plurality of condition or change the condition itself.

As a result, it is possible to prevent a state in which the driver will be requested to perform a task based on a condition that need not be considered essentially, and control can be continued stably while suppressing the load of the driver.

In addition, the first to fourth control examples can be used when an automated driving mode (non-following control mode) without following control is to be shifted to an automated driving mode (following control mode) in which following driving is to be performed.

As a result, it will be possible to avoid a state in which the non-following control mode is shifted to the following control mode by setting a front vehicle, for example, an emergency vehicle or the like, which should not be set as a following target.

In addition, although the above arrangement example described that the vehicle control apparatus is to be provided in the vehicle 1, at least some of the functions of the vehicle control apparatus may be implemented by an external device. For example, the vehicle 1 may transmit the information related to the front vehicle to a server on the Internet via the communication device 24c, receive, from the server, the corresponding control information generated based on the information, and use the received control information to control the vehicle 1. Alternatively, for example, the vehicle 1 may transmit the information related to the front vehicle to one vehicle (a master node) among the peripheral vehicles via the communication device 25a (for example, by inter-vehicle communication), receive, from the master node, the corresponding control information generated based on the information, and use the received control information to control the vehicle 1.

As a result, advanced computation can be performed at a high speed by using a high-performance server that can handle large capacity data, but cannot be mounted on the vehicle 1.

Furthermore, the above-described second to fourth control examples described processing performed in a case in which at least one of lowering the automation level and requesting the driver to perform the predetermined tasks is performed when the speed condition and a specific condition not including the speed condition are not satisfied. However, it may be set so that one of the lowering the automation level and the requesting the driver to perform the predetermined tasks will be performed depending on whether the specific condition not including the speed condition is satisfied.

Summary of Control Examples

1. The vehicle control apparatus according to the above-described control example is a vehicle control apparatus that can obtain periphery information of a vehicle and perform following control including steering and acceleration/deceleration of the vehicle, characterized in that in a case in which a front vehicle which is to be a following target does not satisfy a specific condition not including a speed condition, the vehicle control apparatus performs at least one of lowering an automation level, and requesting a driver of the vehicle to perform a predetermined task which is not requested to the driver in a case in which the front vehicle satisfies the specific condition.

As a result, following control can be continued stably by preparing for a situation in which handling by the driver will be requested due a state in which travel by the front vehicle is possible, but travel by the self-vehicle is impossible.

2. The vehicle control apparatus according to the above-described control example is characterized in that the predetermined task includes at least one of periphery monitoring and gripping of a steering wheel.

As a result, tasks such as periphery monitoring and gripping of the steering wheel can be requested to the driver so that vehicle control can be quickly shifted to the driver in preparation for a state in which travel by the self-vehicle is impossible.

3. The vehicle control apparatus according to the above-described control example is characterized in that the specific condition includes a predetermined relationship between information related to a vehicle type of the vehicle and information related to a vehicle type of the front vehicle.

As a result, by preparing for a state in which travel by the front vehicle is possible, but travel by the self-vehicle is impossible due to vehicle type restrictions, following control by the vehicle control apparatus can be continued stably.

4. The vehicle control apparatus according to the above-described control example is characterized in that the specific condition includes a predetermined relationship between information related to a size of the vehicle and information related to a size of the front vehicle.

As a result, following control by the vehicle control apparatus can be continued stably even in a state in which travel by the front vehicle is possible, but travel by the self-vehicle is impossible due to the vehicle size such as the vehicle width, the vehicle height, or the minimum ground clearance.

5. The vehicle control apparatus according to the above-described example is characterized in that the specific condition is a state in which a probability that the front vehicle will stop satisfying a requirement to be the following target is not more than a predetermined value.

As a result, following control by the vehicle control apparatus can be continued stably by requesting the driver to perform periphery monitoring and the like even in a state in which the front vehicle can be expected to be canceled as a following target due to a lane change or the like.

6. The vehicle control apparatus according to the above-described control example is characterized in that the specific condition is a state in which a detection accuracy of a detected front vehicle is not lower than a predetermined accuracy.

As a result, by requesting the driver to perform periphery monitoring and the like by considering a possibility that a determination that travel is possible for the front vehicle and the self-vehicle is an error in a case in which the detection accuracy of the information related to the front vehicle is low, following control by the vehicle control apparatus can be continued stably.

7. The vehicle control apparatus according to the above-described control example is characterized in that information related to a road is further obtained and the specific condition of the front vehicle is determined based on the information related to the road.

As a result, by excluding, in advance, a road restriction that may become a cause for a state in which travel by the front vehicle is possible, but travel by the self-vehicle is impossible, it will be possible to prevent an unnecessary request from being made to the driver while stably continuing the following control by the vehicle control apparatus.

8. The vehicle control apparatus according to the above-described control example is included in a vehicle.

As a result, it will be possible to suppress a communication delay or the like compared to a case in which the automation level and the tasks to be requested to the driver are determined by another server or the like receiving the information related to the front vehicle from the self-vehicle. Hence, the following control by the vehicle control apparatus can be continued more stably.

9. A vehicle control method to be executed in the vehicle control apparatus according to the above-described control example is a vehicle control method of a vehicle control apparatus that can obtain periphery information of a vehicle and perform following control including steering and acceleration/deceleration of the vehicle, characterized in that in a case in which a front vehicle which is to be a following target does not satisfy a specific condition not including a speed condition, at least one of lowering an automation level, and requesting a driver of the vehicle to perform a predetermined task which is not requested to the driver in a case in which the front vehicle satisfies the specific condition is performed.

As a result, following control can be continued stably by preparing for a situation in which handling by the driver will be requested due a state in which travel by the front vehicle is possible, but travel by the self-vehicle is impossible.

The present invention is not limited to the above-described embodiments, and various changes and modifications can be made within the spirit and scope of the present invention. Therefore, to apprise the public of the scope of the present invention, the following claims are made.

The invention claimed is:

1. A vehicle control apparatus that is configured to obtain periphery information of a vehicle at least based on peripheral image information and perform following control including steering and one of acceleration and deceleration of the vehicle, the vehicle control apparatus comprising:

at least one processor circuit with a memory comprising instructions, that when executed by the at least one processor circuit, causes the at least one processor circuit to at least:

perform the following control with a first driving mode, perform the following control with a second driving mode, in which a steering operation task being requested to a driver of the vehicle is reduced compared to the first driving mode, wherein the following control comprises:

obtaining vehicle body information related to a vehicle body of a front vehicle based on the periphery information, where the front vehicle is positioned in front of the vehicle, when the vehicle body information of the front vehicle corresponds to pre- registered information, permitting to transfer from the first driving mode to the second driving mode, and when the vehicle body information of the front vehicle does not correspond to the pre-registered information, performing a transition from the second driving mode to the first driving mode.

2. The vehicle control apparatus according to claim 1, wherein in the first driving mode, the driver of the vehicle is required to perform at least one of periphery monitoring and gripping of a steering wheel.

3. The vehicle control apparatus according to claim 1, wherein the vehicle body information includes information related to a vehicle type of the front vehicle.

4. The vehicle control apparatus according to claim 1, wherein the vehicle body information includes information related to a size of the front vehicle.

5. The vehicle control apparatus according to claim 1, wherein a mode for performing the following control, in which a probability that the front vehicle will stop satisfying a requirement to be a following target is not more than a predetermined value, is the second driving mode.

6. The vehicle control apparatus according to claim 1, wherein a mode for performing the following control, in which a detection accuracy of a detected front vehicle is not lower than a predetermined accuracy, is the second driving mode.

7. The vehicle control apparatus according to claim 1, wherein information related to a road is further obtained and the vehicle body information is determined based on the information related to the road.

8. A vehicle comprising a vehicle control apparatus, wherein the vehicle control apparatus is configured to obtain periphery information of the vehicle at least based on peripheral image information and perform following control including steering and one of acceleration and deceleration of the vehicle, the vehicle control apparatus comprising:

at least one processor circuit with a memory comprising instructions, that when executed by the at least one processor circuit, causes the at least one processor circuit to at least:

perform the following control with a first driving mode, and perform the following control with a second driving mode, in which a steering operation task being requested to a driver of the vehicle is reduced compared to the first driving mode, wherein the following control comprises:

obtaining vehicle body information related to a vehicle body of a front vehicle based on the periphery information, where the front vehicle is positioned in front of the vehicle, when the vehicle body information of the front vehicle corresponds to pre- registered information, permitting to transfer from the first driving mode to the second driving mode, and when the vehicle body information of the front vehicle does not correspond to the pre-registered information, performing a transition from the second driving mode to the first driving mode.

9. A vehicle control method in which periphery information of a vehicle is obtained at least based on peripheral image information and following control is performed including steering and one of acceleration and deceleration of the vehicle, the vehicle control method comprising:

performing the following control with a first driving mode, performing the following control with a second driving mode, in which a steering operation task being requested to a driver of the vehicle is reduced compared to the first driving mode, wherein the following control comprises:
obtaining vehicle body information related to a vehicle body of a front vehicle based on the periphery information, where the front vehicle is positioned in front of the vehicle, when the vehicle body information of the front vehicle corresponds to pre-registered information, permitting to transfer from the first driving mode to the second driving mode, and when the vehicle body information of the front vehicle does not correspond to the pre-registered information, performing a transition from the second driving mode to the first driving mode.

* * * * *